UNITED STATES PATENT OFFICE.

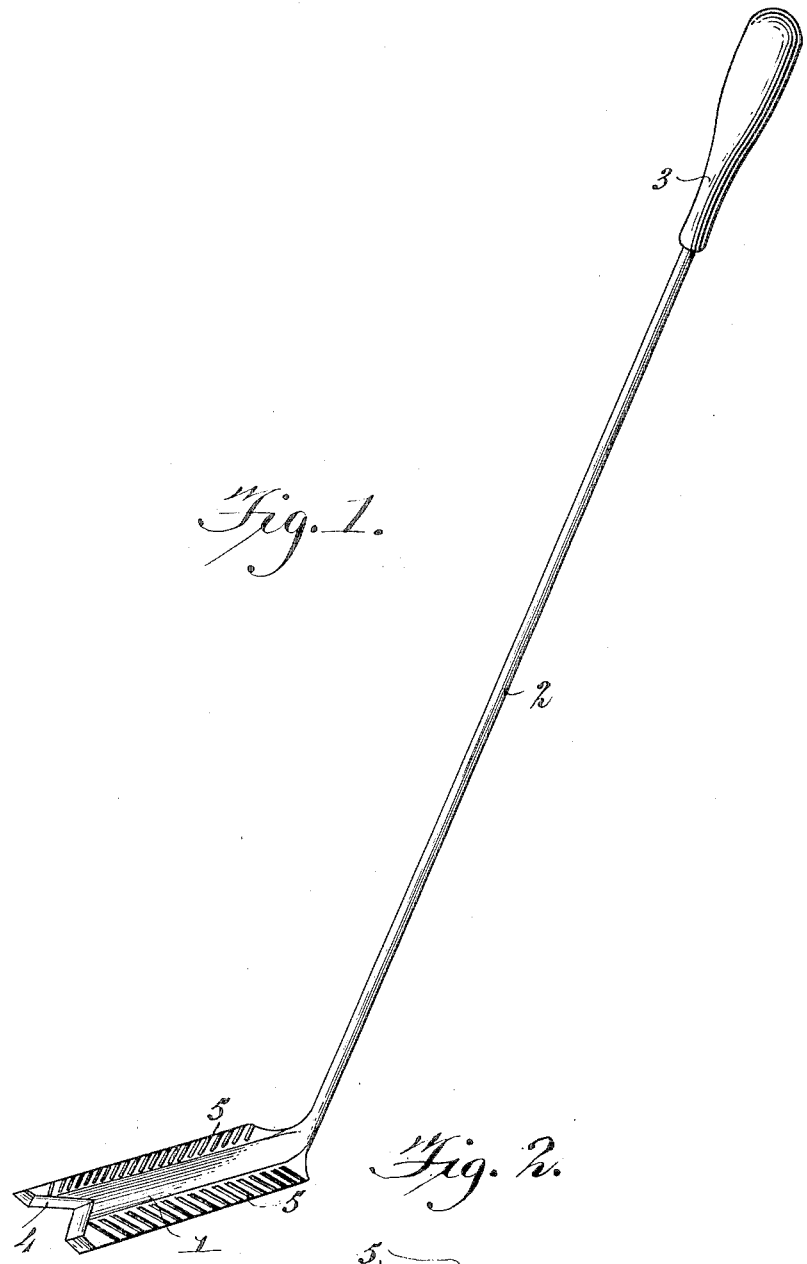

IRA KILBORN, OF SCOTTS MILLS, OREGON.

WEEDER.

1,068,346.　　　　　Specification of Letters Patent.　　Patented July 22, 1913.

Application filed September 11, 1912. Serial No. 719,812.

*To all whom it may concern:*

Be it known that I, IRA KILBORN, a citizen of the United States, residing at Scotts Mills, in the county of Marion and State of Oregon, have invented new and useful Improvements in Weeders, of which the following is a specification.

The present invention provides an implement specially adapted for removing dandelion plants, and the like from the lawn and which may be used generally for weeding purposes, said implement comprising a long blade having a notch at its outer end and formed along its edge portions with serrations which result in saw teeth which facilitate the cutting of roots when extirpating weeds and other obnoxious growths.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a perspective view of a weeding implement embodying the invention. Fig. 2 is a transverse section.

Corresponding and like parts are referred to in the following description, and indicated in both views of the drawing, by the same reference characters.

The implement consists of a blade 1 having a shank 2 to which is fitted a handle 3, the blade and shank being preferably of integral formation. The blade 1 is long and narrow and is provided at its outer end with a notch 4, the edge of the blade bordering upon the notch being beveled to a cutting edge. Serrations 5 are formed along edge portions of the blade 1 throughout its length, said serrations being oppositely inclined and serving to form saw teeth at the edges of the blade when the latter is sharpened. The blade is straight in its length but slightly curved between its longitudinal edges, the concaved side facing downward. The edge portions of the blade having the serrations 5 are beveled, thereby facilitating the sharpening of the blade.

When using the implement the end of the blade is pressed into the ground so as to come beneath the root of the plant or weed to be removed, after which the handle 3 is depressed, with the result that the implement pries the plant from the ground. Should the roots extend laterally the same may be cut by drawing the adjacent edge of the blade across the same. By having both edges of the blade saw toothed and sharpened the implement may be used to cut either to the right or to the left, thereby greatly facilitating the work.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

A weeding implement consisting of an oblong blade having a shank at one end terminating in a handle and having its opposite end notched and sharpened, and having its edge portions oppositely beveled and provided with reversely inclined serrations to form saw teeth at the edges of the blade.

In testimony whereof I affix my signature in presence of two witnesses.

IRA KILBORN.

Witnesses:
　ARTHUR C. RICHIE,
　JOHN S. RICHIE.